Sept. 25, 1962
P. J. WEAVER
3,055,393
PATTERN CONTROLLED MACHINE TOOL
Filed July 14, 1958
3 Sheets-Sheet 1
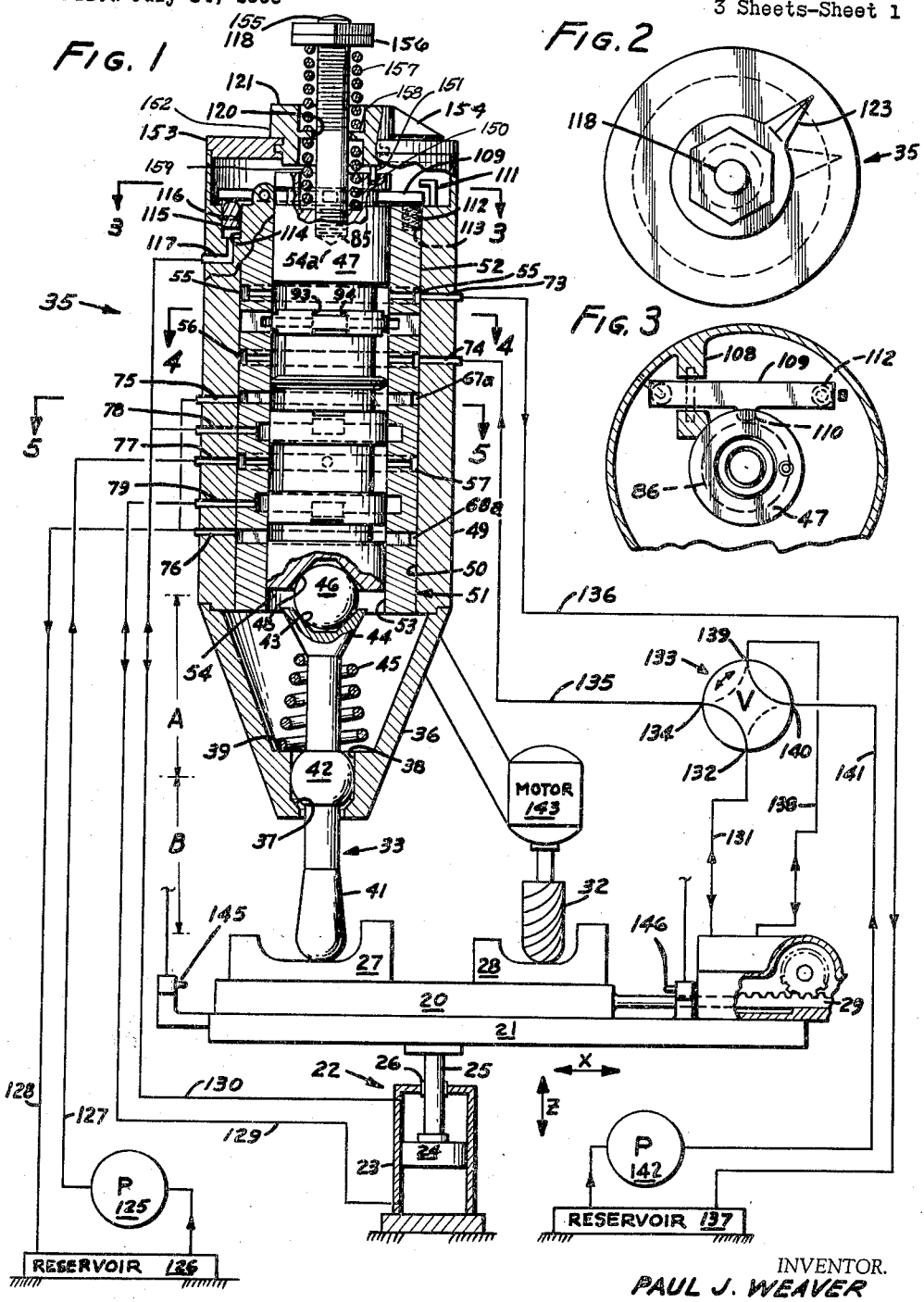
INVENTOR.
PAUL J. WEAVER
BY D. Gordon Angus
ATTORNEY.

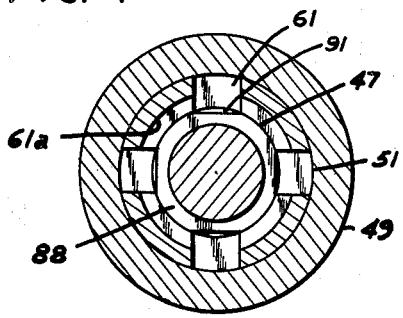
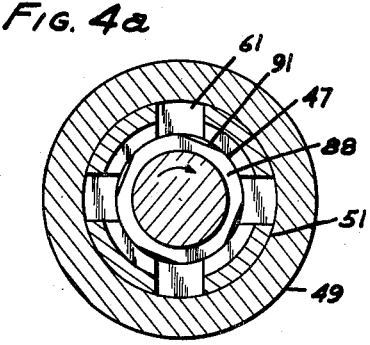
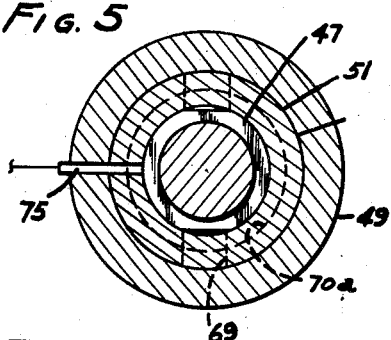
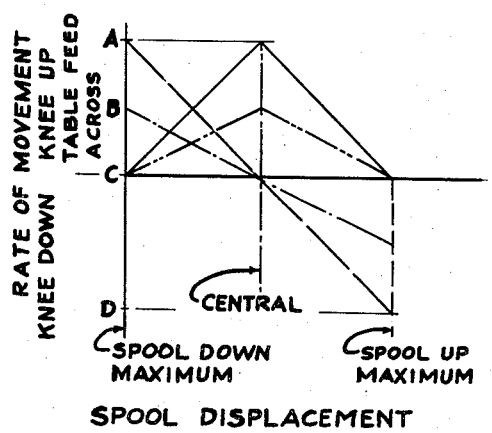
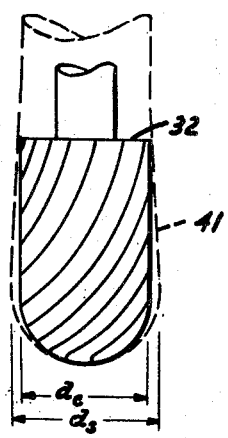

Sept. 25, 1962           P. J. WEAVER           3,055,393
PATTERN CONTROLLED MACHINE TOOL
Filed July 14, 1958                               3 Sheets-Sheet 3
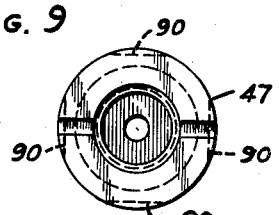
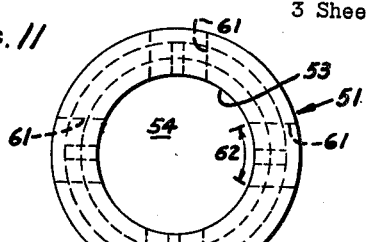
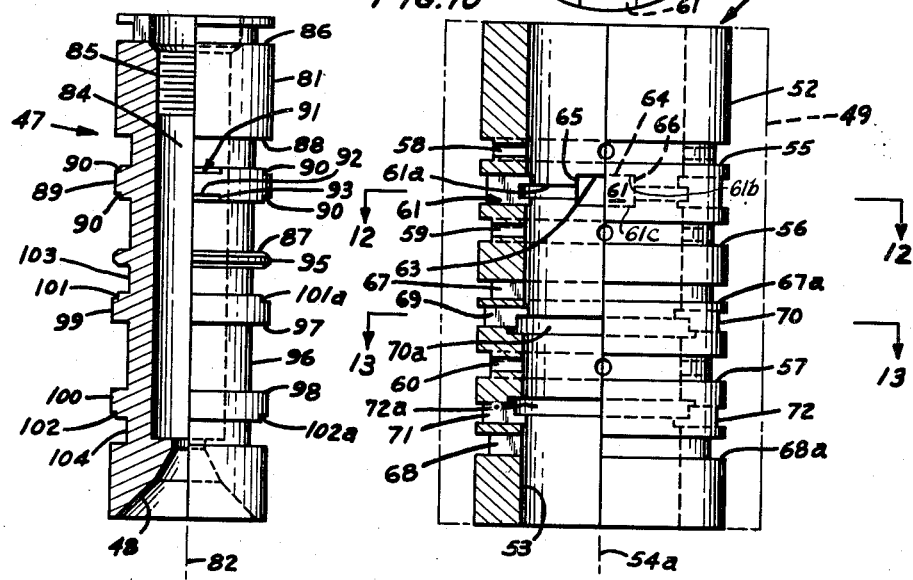
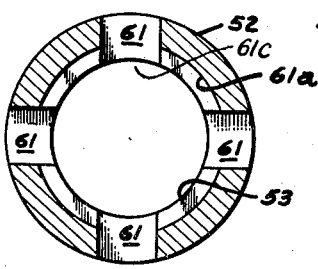
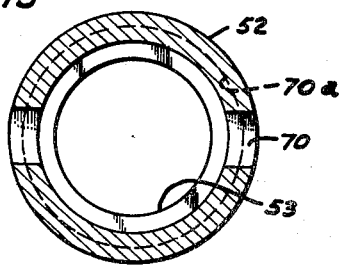
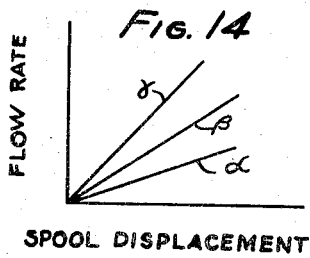
INVENTOR.
PAUL J. WEAVER
BY
D. Gordon Angus
ATTORNEY.

United States Patent Office 3,055,393
Patented Sept. 25, 1962

3,055,393
PATTERN CONTROLLED MACHINE TOOL
Paul J. Weaver, Downey, Calif., assignor, by mesne assignments, to Banstrom Industries, Inc., Los Angeles, Calif., a corporation of Connecticut
Filed July 14, 1958, Ser. No. 748,426
7 Claims. (Cl. 137—622)

This invention relates to contour copying machine tools, and in particular to a control valve therefor.

In the cutting of complex contours with copying machines such as die sinkers, lathe tracers, mills, and the like, it is desirable to maintain a pre-selected rate of feed in whatever direction the cutting tool moves along the workpiece. Thus, it is desirable in a die sinker, for example, to slow down the table feed while the cutting tool plunges down or rises to machine a steep slope. This is to say that there should be an inverse relationship between the relative velocities between the cutting tool and workpiece on the coordinate axes of the plane in which they are moving relative to each other. If the tool speeds up along the one axis, it should slow down along the other, or even stop altogether, and vice versa. With such an arrangement, the linear tracing speed of a stylus tracing over a pattern, and the linear rate at which the cutting tool moves in a workpiece being machined remains sensibly constant despite changes of slope in the contour being traced.

Machine tool controls for accomplishing the above objectives are known, and for one given feed rate for each control, they work reasonably well. However, particularly in job shops where one machine must be adaptable to perform many jobs among which the feed rates may vary widely, the previously known machines have not provided a sufficient range of feed speeds. In attempts to provide a range of feed speeds, and also to provide the said inverse relationship, many complicated machines have been devised, none of which has received wide acceptance.

One reason for the previous inability of previously-known machines to provide for a wide range of flow rates together with an inverse rate relationship is that almost invariably they depended for rate control upon a regulation of the amount of stylus deflection. If the rate was to be low, the stylus could be deflected only slightly. However, very small valve deflections meant equally small valve adjustments, and almost impossible valve manufacturing accuracies. It was found that even the most carefully manufactured valve could not hold the desired tolerance for close work, at least partly because of valve chattering which occurs when flow valves are operated at a just-cracked-open condition.

This invention provides, so far as is known, the first hydraulic control valve in which the control of feed rate is completely independent of stylus deflection, and in which the same amount of stylus deflection can control machine tools at widely varying rates.

Accordingly, it is an object of this invention to provide a machine tool control valve which provides controlled movement along a pair of non-parallel axes, at inverse rates of speed, over a wide range of feed rates.

An additional object is to provide a machine tool control which can operate automatically and without operator supervision.

The control valve of the invention is adapted to be used to control movements in a machine tool which has feed movement along two non-parallel axes, and which includes motors for moving tool elements along said axes. The control valve is interposed between said motors and a source of fluid under pressure for regulating the operation of the motors. The valve includes a stylus for tracing over the surface of a template or pattern to be copied, and the movement of the stylus adjusts the valve in order to control the motors. The valve includes one portion which reversibly moves the machine along one axis in response to stylus position, and another portion which controls the rate of movement along the other axis in response to stylus position.

A feature of this invention resides in rate control means wherein the control valve is a substantially cylindrical spool valve, including a spool and a sleeve within which the spool is axially shiftable and also rotatable, the spool and sleeve having a hollow and a depression, respectively, which co-act as an adjustable fluid restriction, the size of the restriction being a function of both axial displacement and rotational adjustment of the spool in the sleeve.

The above and other features of this invention will be fully understood from the following detailed description and the accompanying drawings, of which:

FIG. 1 shows a die sinker incorporating the invention;
FIG. 2 is a top view of a portion of FIG. 1;
FIGS. 3, 4 and 5 are cross-sections taken at lines 3—3, 4—4 and 5—5, respectively;
FIG. 4a is a showing of FIG. 4 with parts thereof in a different operating position;
FIG. 6 is a graph showing the scheme of operation of this invention;
FIG. 7 is a superimposed view of two parts of the tool of FIG. 1 showing certain relative dimensions;
FIG. 8 is a side elevation partly in cutaway cross-section of one part of a valve in FIG. 1;
FIG. 9 is a top view of FIG. 8;
FIG. 10 is a side view partly in cutaway cross-section of still another part of a valve shown in FIG. 1;
FIG. 11 is a top view of FIG. 10;
FIGS. 12 and 13 are cross-sections taken at lines 12—12 and 13—13, respectively, of FIG. 10; and
FIG. 14 is a graph showing the scheme of operation of a component of this invention.

In FIG. 1 a milling machine is shown under control of a valve according to this invention. The milling machine has a work table 20 which is reciprocable on horizontal ways 21. The table moves, relative to the ways, along an axis marked "X" in the drawings. The ways are supported on a knee 22 so that by operation of the knee the table can be reciprocated vertically along an axis marked "Z" in the drawings.

The knee 22 includes a knee cylinder 23 which rests upon a foundation and which encloses a piston 24. To the piston there is attached a rod 25 which passes through a gland 26 at the upper end of the cylinder. This cylinder and piston assembly drives the worktable along the "Z" axis, and is sometimes herein called a "fluid motor."

A pattern 27 (sometimes called a template) and a workpiece 28 are mounted to the top of the work table.

A fluid motor 29, preferably of the hydraulic meshed-gear class is mounted to the ways and is drivingly connected to the work table. Motor 29 drives the work table along the "X" axis.

The two motors each have a pair of motor ports for receiving working fluid. The types of motors shown are examples of suitable fluid motors, and either type can be used on either axis. The type of fluid motor shown is no limitation on the invention, because the essence of the invention is the control of pressurized fluid to operate the motor, irrespective of the type of motor.

The two fluid motors, by appropriate operation, can shift the work table, pattern and workpiece in unison anywhere in the "XZ" plane (the plane of FIG. 1) within the limits of the device. It is the object of this invention to cause the pattern to be scanned and to move the work table in the plane of FIG. 1 so that a cutter 32 will mill the contour of the pattern into the workpiece. The scanning is accomplished by causing a stylus 33 of a control valve 35 to move along the surface of the pattern. This stylus movement operates valve means to be described and thereby regulates the operation of both fluid motors to move the table so that the pattern and the workpiece maintain correlated positions between the stylus and the cutter, respectively.

The control valve 35 according to this invention has a conical nose housing 36 with an interior conical seat 37 near the lower end of a stylus passage 38. Adjacent to the upper end of the stylus passage 38 is a spring-retaining shoulder 39. The stylus 33 passes through the stylus passage, and has a pendular portion 41 extending beyond the nose housing. A ball-like mounting member 42 is incorporated in the stylus at an intermediate portion thereof. The outer contour of member 42 is generally spherical. The mounting member is reciprocable in the stylus passage along the "Z" axis, and its lowermost position is defined by the seat 37, which restrains it from further downward movement.

At its upper end the stylus has a conical seat 43, the seat having a 90° included conical angle. The outer portion of this end is tapered at 44. A counter-balance spring 45 is disposed between the tapered portion 44 and the spring-retaining shoulder 39 for counteracting the weight of certain elements which rest upon the stylus from above.

A ball 46 rests in the seat 43 and supports a spool 47. The lower end of the spool has, as shown in FIG. 1, a conical seat 48 with a 90° included conical angle which matches that of the conical seat 43 in the stylus. It will be seen that either lifting or tilting the stylus will cause the spool to move in an upward direction.

It is preferable, but not necessary, for the dimensions "A" and "B" to be equal. That is, the distance from the center of ball 46 to the center of rotation of the mounting member (dimension "A") should equal the distance from said center of rotation to the center of curvature of the pendular portion 41 of the stylus (dimension "B").

The nose housing 36 is attached to an outer housing 49. The outer housing surrounds the valve mechanism so as to close it up. It permits the valve to be manufactured in the simple and expeditious manner to be described. The fluid connections in the outer housing 49 will be described after the remainder of the valve components have been described.

The outer housing has an axial bore 50 passing therethrough. A valve sleeve 51 is pressed into this bore. The valve sleeve, along with spool 47, forms a spool valve which in response to actuation by the stylus controls the relative movements of the workpiece and the cutter along the "X" and "Z" axes.

For convenience in manufacture the sleeve is formed as shown in FIG. 10. Initially the sleeve 51 is a hardened metal cylinder having an outer periphery 52 and an interior wall 53 that defines a spool passage 54. The sleeve has a central axis 54a. An outlet groove 55, an inlet groove 56 and a pressure groove 57 are formed in the outer peripheral surface 52 of the sleeve. Outlet port 58, inlet port 59 and pressure port 60 are drilled radially through the sleeve to inter-connect the grooves 55, 56 and 57 respectively with the spool passage.

Four broached openings 61 are formed in the wall. Since their outer ends are closed by the outer housing, it will be recognized that each essentially forms a recess in the wall of the sleeve passage. Each opening has three significant portions: (1) a first "depression" 61b, (2) a second "depression" 61c, and (3) the central areas of openings 61 which fluidly interconnect respective depressions 61b and 61c, which central areas are herein referred to as "flow channel means."

A groove 61a may be ground into the sleeve wall, and interconnects openings 61. Its axial length is less than the axial spacing between the farthest-apart edges of depressions 61b and 61c. Groove 61a is not an essential part of the flow channel means, but does serve to improve the flow pattern through this part of the valve.

A convenient manufacturing technique is first to grind in groove 61a, and then pass a rectangular broach diametrically through the sleeve and normal to the sleeve axis to form the openings. When four openings are made, the broach is passed through twice, along axes which are normal both to the sleeve axis and to each other.

In FIG. 11, a dimension 62 is shown. It is the peripheral length of a depression measured along the wall of the spool passage in a plane normal to the axis of the sleeve. This dimension is herein referred to as the circumferential length of the opening of the respective depression in wall 53. The total length of dimensions 62 in any one plane should not exceed one-half the circumference of the wall of the spool passage.

Depression 61b will be disclosed in detail, it being exemplary of the other depressions. Furthermore, the depressions at the other openings 61 are the same. It is best shown in FIGS. 10 and 12. It includes a sleeve edge 63 having three segments. A first segment 64 lies in a plane that is not parallel to, and is preferably (though not necessarily) in a plane that is perpendicular to the central axis of the sleeve (as shown). There are also second and third segments 65 and 66 which intersect the opposite ends of the first segment and extend away from said first segment on the same side of a plane that includes segment 64. Depression 61c includes like segments. In the example given, its second and third segments are actually continuations of those of depression 61b, because they were formed simultaneously by the same broach. This structure, being duplicated at both axial ends of the broached structure, forms, for operating purposes, two depressions which are interconnected by the recessed central region of the broached opening.

On opposite sides of the pressure groove 57 there are drilled through the wall of the sleeve a pair of exhaust passages 67, 68. These passages connect with exterior exhaust grooves 67a, 68a, respectively.

Two depressions 69, 70 are formed between exhaust passage 67 and pressure groove 57, and two other similar depressions 71, 72 are formed between exhaust passage 68 and pressure groove 57. These depressions are formed in the same manner, and have the same edges and segments, preferably with the same corresponding dimension as dimension 62, as described in connection with depressions 61b or 61c, except that there are only two depressions at each groove, and they are 180° apart.

One set of depressions 61b and 61c is angularly aligned with depressions 69 and 71. A radially opposite set of depressions 61b and 61c is angularly aligned with depressions 70 and 72. The remaining sets of depressions 61b and 61c are 90° away from angular alignment with any of depressions 69–72, inclusive.

Interior motor supply groove 70a interconnects depressions 69 and 70, and interior motor groove 72a interconnects depressions 71 and 72. Depressions 69—72 are on the side of their respective grooves farthest from the pressure ports 60.

The angular alignments set forth above represent the most easily manufactured embodiment. As remains to be shown, each depression relates and interacts with a respective hollow on a spool within the sleeve. So long as the respective pairs of depressions and hollows are rotationally aligned, it makes no difference how they are aligned relative to depressions and hollows with which they do not co-act. However, the rotational alignment arrangement is easier to make in correct relationship than one where the various depressions and hollows are staggered, which would require careful angular indexing in manufacture. However, even though less convenient, such an arrangement would still be useful and within the scope of the invention.

With reference to FIG. 1, it will be seen that when the sleeve is pressed into the outer housing, the outer housing closes off the grooves and depressions at the outer periphery of the sleeve. Communication to the spool passage is provided for by drilling appropriate ports through the outer housing to intersect the grooves at the outside of the sleeve. These ports are shown in FIG. 1. For example, the outlet groove 55 is connected to an outlet port 73 which passes through the outer housing. The inlet groove 56 communicates with the outside of the valve through an inlet port 74 through the outer housing. The exhaust grooves 67a and 68a communicate with the outside of the valve through exhaust ports 75, 76, respectively. The exhaust grooves and exhaust ports are sometimes collectively called "exhaust passages." The pressure groove 57 communicates with a source of pressure through pressure port 77. Groove 57 and port 77 are sometimes collectively called a "pressure passage." The depressions 69, 70 and 71, 72, respectively, communicate with each other through their grooves 70a and 72a. Either depression 69 or 70 connects to a first cylinder port 78 and one of depressions 71 or 72 connects to a second cylinder port 79 through the outer housing. In FIG. 1, in order to simplify the drawings, ports 78 and 79 (sometimes called "motor supply ports") are shown connected to conduits intersecting grooves 70a and 72a. It will be undestood that this short conduit length is really a simplified schematic showing of the connection between a depression and its respective port. The valve spool member is shown in its "central" position in FIG. 1.

A spool 47 (see FIG. 8) is adapted to be slidably and rotatably moveable in the spool passsage 54. The spool has a generally circular cylindrical outer peripheral surface 81, and, except where modified by certain hollows and grooves, the peripheral surface 81 is adapted to maintain surface-to-surface contact with the radially innermost portions of the interior wall 53 of the spool passage. The spool has a central axis 82 which coincides with sleeve axis 54a when the spool is placed inside the spool passage. The spool is preferably provided with a bore 84 through the center for lightening the structure, and threads 85 are provided in the upper end of this bore for a purpose to be described. A groove 86 is formed in the peripheral surface near the upper end of the spool.

At an upper portion of the spool as shown in FIG. 8 there are two grooves: an inlet groove 87 and an outlet groove 88. Between these grooves there remains a control land 89 which, as can be seen from FIGS. 8 and 10 stands opposite the four openings 61 in the interior wall 54 of the sleeve when the spool is centered in the sleeve. FIGS. 8 and 10 are oriented so that the spool, although shown outside the sleeve, is at the same relative elevation on the sheet with respect to the sleeve that it would have at its centered position in the sleeve.

The axial length of the control land 89 is, except at certain hollows to be described, greater than the axial length of openings 61. This control land, which is part of the peripheral surface of the spool, is modified by forming four hollows 90 at each edge thereof. Each hollow intersects the outer peripheral surface of the spool to form an edge 91, hereafter referred to as a spool edge. Because all of the hollows are identical, only one will be described in detail. Each spool edge 91 has a first segment 92 which lies in a plane which is non-parallel to the central axis, and which preferably (but need not) lies in a plane which is perpendicular to the central axis of the spool (as shown in the drawings). Second and third segments 93 and 94 intersect opposite ends of the first segment and extend away from the first segment on the same side of the plane which includes the first segment. The second and third segments of the spool edges extend in the opposite direction from the plane including their first segments than the second and third segments of the sleeve edges 64 extend from a corresponding plane including their first segments.

The first segments 92 of radially aligned members of pairs of hollows 90 are axially spaced apart by a distance which is less than the axial spacing of the first segments 64 of the sleeve edges in the respective depressions 61b and 61c so that with the spool in the central position shown in FIG. 1, and the depressions and hollows at least partially aligned, that is, with segments 64 and 91 rotationally at least partially aligned there is an underlapped condition, as shown in FIG. 1, and fluid can flow from the inlet port 74 into the inlet grooves 56 and 87, through depressions 61c, through the flow channel means, through depression 61b, outlet grooves 88 and 55, and thence through the outlet port 73. It will be appreciated that sliding the spool in either direction from the central position will tend to cause the flow along this path to be throttled down, or even shut off. Flow "through the depressions" is that which is passed by the underlapped condition of first segments of respective depressions and hollows. The term "underlapped" means an axial spacing of segments with an opening for fluid flow formed between them. "Overlapped" means an axial spacing wherein no opening is formed. Instead, there is a metal-to-metal seal shutting off flow at those segments. The aforesaid relates to underlap and overlap of the edges. When referring to the grooves, however, "overlap" means a valve open condition, and "underlap" means a valve closed condition.

Within the range of movement of the spool in the sleeve, the spool outlet groove 88 is always in fluid communication with the groove 55, and the inlet groove 87 is always in communication with the inlet groove 56.

A sealing land 95 is disposed adjacent to the inlet groove 87. A pressure groove 96 is ground in the outer peripheral surface of the spool and this groove is bounded by edges 97, 98 which are circular and which lie in planes perpendicular to the central axis of the spool. These edges lie at the ends of a pair of control spool lands 99, 100. The surfaces of these spool lands form part of the cylindrical peripheral surface of the spool, and each is modified at one of its edges by a pair of hollows 101, 101a, and 102, 102a, respectively, which are on the opposite sides of the lands from the central pressure groove. At the side of the lands having the hollows there are formed spool exhaust grooves 103, 104, respectively. The hollows 101, 101a, and 102, 102a, respectively, communicate with the spool exhaust grooves 103, 104. The spool exhaust grooves are always in fluid communication with exhaust grooves 67a and 68a, respectively, which in turn communicate with exhaust ports 75, 76.

The pressure groove 96 is always in communication with pressure groove 57 in the sleeve. The hollows 101, 101a, 102 and 102a are formed with first, second and third segments like those of hollows 90. Hollows 101 and 102 are axially aligned with each other, and with a hollow 90 on each edge of land 89. Hollows 101a and 102a are axially aligned with each other, and with a hollow 90 on each edge of land 89. The remaining hollows 90 are axially aligned in pairs, these pairs being spaced 90° from axial alignment with any of hollows 101, 101a, 102 and 102a.

The hollows may be made by grinding off part of the corner where the lands and the grooves intersect. A design criterion of the hollows is that their first segments should all be of substantially the same peripheral length, preferably the same peripheral length as that of the first segment of the respective opposed depression. It is also preferable, although not necessary, that the second and third segments of all of the depressions and the hollows should be parallel to the central axes, although this is not a necessary limitation. They could have any angular relationship relative to each other which might be desired. The first segments on any edge, either of the spool or of the sleeve, should not have a total peripheral dimension greater than one-half the circumference of the respective edge, as heretofore described with respect to dimension 62 in FIG. 11.

On each edge of the control land 89 there are four hollows, while on control lands 99 and 100 there are only two hollows at each edge. The total circumferential length of the hollows at lands 99 and 100 is therefore one-half of the corresponding length at land 89, and the same relationship holds for the depressions. This preferred, but not essential, relationship is provided to enable fluid to flow about at fast in the upper part of the valve as in the lower. In the lower part of the valve, the fluid flows past only one relatively narrow restriction, which, in the example given, is on the exhaust side of the circuit. However, in the upper part, there is likely to be at least some meeting effect at both edges of land 89. Doubling the number of orifices at least in part compensates for this. Of course, if the lower part of the valve is built so that there is also some throttling control of the pressure side, such doubling might no longer be desired. Also, the greater throttling in the upper part of the valve might not be considered undesirable in many applications. The terms "upper" and "lower" in this paragraph relate to the regions about land 89, and about lands 99 and 100, respectively.

For installations of the type shown in FIG. 1, it is desired to keep the pressure of the stylus against the pattern as low as possible. This is for the reason that patterns are sometimes used which are made of relatively soft material, and which ought to be reused many times. At the same time, because the stylus is a precisely made part of the control valve, whose dimensions are critical, it is made of very hard material.

High pressure between the stylus and the pattern causes rapid pattern wear, and ultimate loss of accuracy in the reproduced parts, and calls for frequent pattern replacement. This is one of the reasons for providing spring 157, because spring 157 counteracts at least a part of the wegiht of the spool.

Adjacent to the upper groove 86 of the spool (see FIG. 1), there are provided means for returning the spool to a position slightly below the illustrated central position under certain conditions. For this purpose, a hinge block 108 is attached to the sleeve. A lever 109 is mounted to the hinge block. As can best be seen in FIG. 3, the lever has a finger 110 which projects into groove 86. The pin is thinner than the width of groove 86, so that the lever does not contact the edges of groove 86 during routine tracing operations. A limit stop 111 on the housing 49 limits the upward travel of the right-hand end of the lever. The right-hand end of the lever as shown in FIGS. 1 and 3, is urged upward by a bias spring 112 which is seated in a sink 113 in the end of the sleeve.

At the other side of the hinge block from the bias spring 112 there is a cylinder 114 within which a plug 115 is fitted that is vertically slidable in cylinder 114. A packing 116 seals around the plug 115. A pressure port 117 connects cylinder 114 to a source of fluid under pressure. The force exerted by the plug as a result of pressure at port 117 is opposed to the bias effect of spring 117.

Means is provided at the upper end of the control valve for adjusting the angular position of the spool within the sleeve. For this purpose, an axial spline groove 150 is formed in the top of the spool. A depending tang 151 rides in this groove so that the spool can slide up and down relative to the tang. The tang depends from a bearing 152 which is engaged to the cap 153. As the bearing is turned, the tang turns the spool. A pointer 154 indicates the position of the tang. A screw 155 passes up through the bearing, and carries a lock nut 156. A bias spring 157 is compressed between the nut 156 and a shoulder 158 inside the bearing. A centering spring 159 is compressed between shoulder 158 and the top of the spool. Spring 159 tends to keep the spool against ball 46. Spring 157 can be adjusted to add to or take away from the force of the centering spring 159 and spring 45 so as to provide an adjustability of stylus pattern pressure required to shift the spool.

FIGS. 4 and 4a show the spool positions resulting from the two pointer alignments of FIG. 2. The position resulting from that indicated in solid line in FIG. 2 is shown in FIG. 4, and that of the dotted line in FIG. 4a.

The knee cylinder motion is controlled by the lower part of the control valve 35. For supplying power to the knee cylinder, a pump 125 withdraws fluid from a reservoir 126 and discharges the fluid under pressure through conduit 127 into pressure port 77. Exhaust outlets 75 and 76 both discharge into a conduit 128 which discharges exhaust fluid from the valve back to reservoir 126.

A lower cylinder line 129 interconnects the portion of the knee cylinder below the piston to cylinder port 79, while an upper cylinder line 130 connects the region of the knee cylinder above the piston to cylinder port 78 and also to pressure port 117.

The horizontal table travel is controlled by motor 29. One motor port of motor 29 is connected to a conduit 131 which conduit connects to a first port 132 of a four-way valve 133. A second port 134 of the valve is connected to one end of a conduit 135, the other end of said conduit being connected to the inlet port 74 of the control valve. Another conduit 136 is connected to outlet port 73 and discharges into a reservoir 137.

To the other motor port on motor 29, there is connected a conduit 138, and this conduit is connected to a third port 139 of the four-way valve. The fourth port 140 is connected to a conduit 141 which receives fluid under pressure from a pump 142. The pump draws fluid to be placed under pressure from the reservoir 137. The four-way valve can be turned so as to make two different connection arrangements. One arrangement is shown in solid lines in FIG. 1, and the other arrangement is shown in dotted lines.

A motor, or other driving source 143 is mounted to the same structure as the control valve and operates the cutter 37 for machining the workpiece.

Limit switches 145 and 146 are mounted to the ways so as to be contacted by the work table when it has reached the end of its stroke. The location of these limit switches can be adjusted as desired, and on their being contacted they may be used to provide signals for various purposes, such as reversing the setting of the four-way valve 133 in order to reverse the direction of table movement, and they may also be used to provide an impulse for the purpose of stepping over the work table in a direction perpendicular to the plane of FIG. 1, as by a pick feed, in the event that another set of ways perpendicular to the plane of FIG. 1 is provided. This can provide a completely automatic three-dimensional tracing mechanism.

The term "groove" as used herein is not to be limited to circumferential grooves. A circumferential groove is the easiest construction to make. However, broached openings and the like, which have the quality of a recess in a wall or surface for fluid flow, are grooves in precisely the same functional sense.

The spool valve characteristics can best be understood by referring to FIGS. 6 and 14. FIG. 14 shows the relationship between flow rate through the spool valve 35 past a pair of underlapped first segments as a function of the axial displacement of the spool 47 within the sleeve 51, and also of the rotational alignment of the spool in the sleeve. For example, the line marked $\alpha$ represents the flow rate control resulting from the axial overlap of first segments of a spool hollow and a sleeve depression for a given amount of angular overlap $\alpha$. That is to say, the fluid flow rate relative to spool displacement of the line marked $\alpha$ occurs when the first segments are radially overlapped by some amount, when a second or third segment of either a hollow or a depression lies between the second and third segments of the opposite hollow or depression. The angle $\alpha$ represents in this case a relatively small angle and a resulting small angular overlap of first segments. It will be seen that at the origin of this graph where the first segments do not axially overlap (because the spool is not displaced), the flow is cut off. Then as the spool is increasingly displaced, the flow through the opening created by the axial overlap of the first segments increases, practically as a straight-line function of the increasing spool displacement.

The graph marked β represents the flow conditions of the same spool and valve with a greater radial overlap of the first segments, which might be attained by rotating the spool through an angle β, which is greater than angle α. As can be seen from this graph, when there is no axial overlapping of the first segments, flow is completely cut off because then of course there is no flow orifice. As the spool is displaced so as to create axial overlap of the first segments, then again the flow opening and the flow rate is practically a straight-line function of the spool displacement relative to the sleeve. It will be noted that because of the greater radial overlap of the first segments compared with line α, a greater volume or rate of flow can pass through the orifice thus created for the same axial displacement.

The above situation is even more pronounced with the line marked γ, for in this case there is an even greater overlap or perhaps even total radial coincidence of the first segments. In this case as in the above two cases, when there is no axial overlap of the first segments, flow is completely cut off. Then, as the spool is displaced, the flow rate through the orifice thus created is practically a straight-line function of spool displacement.

Now taking for example any particular spool displacement relative to the sleeve which might for instance be caused by a stylus shifting or tilting, a vertical line drawn from the value of said axial spool displacement along the abscissa would cut the lines marked α, β and γ at different flow rates. This is to say that the flow rate through this valve is a function both of axial spool displacement and of the rotational position of the spool relative to the sleeve, and, what is very important, for a given axial displacement the flow rate can be controlled by turning the spool relative to the sleeve. This means that the valve is no longer solely dependent upon control of stylus deflection in order to control the rate of flow therethrough, but instead a different rate setting can be obtained for any given stylus deflection. This is an important consideration because it is no longer necessary, in order to operate at low speeds, to attempt to operate spool valves with spool deflections measured in millionths of an inch. Extreme difficulty has been experienced heretofore with such requirements because the very tiny slit openings extending around the entire periphery of the spool openings are very apt to silt up even when the finest filters are placed in the system. In the instant invention, the same flow area is provided, but around less than the entire periphery, and therefore the width of the slit is great enough to avoid silting up, and the valve does not chatter.

The scheme illustrated in FIG. 14 does away with all these problems, for now the control of rate of feed control can be determined independently of the stylus deflection. Feed rates as slow as one-sixteenth of an inch per minute have been successfully carried out on very hard materials with this valve with good finishes and close tolerances. Because the axial overlap of the first segments for any given rate of flow can be made relatively large (by reducing the amount of angular overlap of the first segments), there is no tendency for the valve to silt up.

The operation of the machine tool under the control of this valve is illustrated in FIG. 6. The solid line departing from point "C" represents the table feed rate, which in the embodiment shown, is in one direction until reversed by changing the setting of the four-way valve. In this case, when the spool is down in the sleeve by its maximum amount, the table feed stands at point "C" which is zero speed. When the valve is centralized the table feed is at a maximum speed, at the level marked "A." When the spool reaches its maximum upward displacement, the table feed is again cut to zero. It will therefore be seen that the maximum rate of table feed occurs when the spool is in the central position illustrated in FIG. 1, and drops off when the spool is moved in either direction from center. This table feed is controlled by the upper portion of the spool valve and represents the result of feeding motor 29 with hydraulic fluid throttled in the spool valve between inlet port 74 and outlet port 73.

The solid line graph beginning from point "C" represents the maximum rate of table feed, and represents the condition obtaining when the first segments of the depressions and hollows are fully aligned (as in FIG. 4). The other line departing from point "C" consisting of a line broken by a double-dash illustrates what occurs when the spool is turned to the position shown in FIG. 4a, wherein the first segments overlap about half-way. Second or third segments of either the hollow or the depression will stand radially about midway between second and third segments of the opposed hollow or depression. It will be noted that at each spool position (other than where the rate is zero) the rate of movement is approximately one-half that of the maximum shown in solid-line, which is to say that the rate of table feed is a function not only of axial spool movement but also of its rotational adjustment within the sleeve.

The diagonal line beginning from point "A" illustrates the movement of the knee. The ordinate above point "C" represents upward movement of the knee, and the ordinate below point "C" represents downward movement of the knee. It will be seen that as the spool attains its maximum downward displacement in the sleeve, with the spool in the position shown in FIG. 4 (which is the same position represented by the solid line departing from point "C"), the knee is moving in an upward direction at its maximum rate. When the spool is in its central position there is no upward or downward movement of the knee. The stylus at that time is in contact with the pattern and has centralized the spool. When the pattern has made contact with the stylus so as to move the stylus, and with it the spool to the spool's maximum upward displacement, then the knee has a maximum downward rate of movement as shown.

When the spool is placed at the rotational position shown in FIG. 4a, the condition is shown by the line departing from point "B" (with the single dash in the broken line). In this case the movement is in the same direction as that defined by the line from point "A," but the rate is about one-half.

It will therefore be seen that the knee and table feed rates are inverse, that is, when one rate increases, the other decreases. Also the direction of the knee movement is reversible. It will further be noted that the rates of table feed and knee movement are simultaneously coordinated by rotating the spool, so that there is no necessity for any additional rate coordination. Merely by turning the spool in the sleeve to some given rotational position, any one of a family of rate lines as shown in FIGS. 6 or 14 can be attained which will represent the desired rates of feed. It will be understood that the lines shown in FIGS. 6 and 14 are exemplary only and that there is an infinite number of lines which might also have been drawn, because the spool is subject to infinitesimal adjustment both in its axial and in its rotational movements.

The operation of the device in FIG. 1 will now be described. Initially the upper cap will be turned so as to provide a desired angular overlap of the first segments throughout the valve. This will establish, as can be seen from FIGS. 6 and 14, the maximum rates of movement of both the table feed and the knee.

If the stylus is not initially in contact with the pattern, it will move downward of its own weight until the ball-like member 42 rests upon the conical seat 37 or until the tip 41 of the stylus contacts the pattern, whichever occurs first. This allows the spool to move downward and causes the control land 89 to move down so as to shut off the flow of fluid to the outlet port 73 of the valve, so that no fluid can flow out of motor 29. This is the situation shown graphically at the left end of FIG. 6. At this time the knee will move upwardly so as to tend to contact the stylus, because pressure groove 96 overlaps motor supply groove 72a. Motor supply groove 70a communicates with exhaust groove 103. Back pressure regulation and rate control are accomplished by the orifice created between the segments of depression 69 and hollow 101, and of depression 70 and hollow 101a, where the first segments are axially spaced apart to form the orifice between them (a condition sometimes referred to as "axially underlapped"). This same arrangement will occur whenever the stylus plunges downwardly into a cavity in die sinking, for example.

After the stylus makes contact with the template the knee continues to move upwardly tending to restore the spool to the centralized position shown in FIG. 1. As soon as the stylus lifts the spool somewhat, the table feed will start. Its rate varies from zero to some maximum value, depending on the stylus and spool position. The tendency is to centralize the valve and at this point the control land 89 is centralized between the first segments 64 of both axial ends of depressions 61. Then there is a full rate flow of fluid to motor 29 so that the table feeds at the maximum rate allowed by the rotational position of the spool within the sleeve.

If the surface remains horizontal the spool remains centered and there is no tendency for the spool or the knee to move up or down, because pressure groove 96 evenly spans the space between grooves 70a and 72a, so that no pressure differential exists across the knee motor.

If there is any variation in contour from the horizontal, then the spool will be moved up or down thereby slowing the table feed rate and speeding up the movement of the knee in an upward or downward movement as appropriate. Should the stylus reach a sharp shoulder or a steep rise which it must climb in the pattern (achieved in this case by dropping the table) the stylus is tilted and this reaction through ball 46 causes the spool to be moved to its uppermost position. This condition is shown at the right-hand edge of the graph of FIG. 6 at which case the upper portion of the valve has again cut off the table feed and the lower portion of the valve permits the flow to go to the cylinder. Pressure groove 96 communicates with motor supply groove 70a, and motor supply groove 72a communicates with exhaust groove 104. Back pressure regulation and flow rate control are exerted by the overlapping of the lower edge of land 100 and the upper edge of groove 72a, which edges bear depressions and hollows as described above.

If it is desired to reverse the direction of table movement, then the four-way valve is adjusted so that it makes the interconnection shown in dotted-line in FIG. 1, instead of that shown in solid-line. This will reverse the feed to the table cylinder.

It may occur in the operation of this device that the stylus will drop into a pattern cavity which is quite deep, and the length of travel available to the knee cylinder is not sufficient to permit the stylus to reach the bottom of the cavity. If means were not provided to take care of this situation, then the table feed motor would not start up again, and the machine would not be truly automatic. It would simply hang up over the cavity. To avoid this, the fluid port 117 is connected to the upper end of the knee cylinder through conduit 130. When the knee cylinder reaches its uppermost position, with the stylus dangling over a cavity, then the conduit 130 is open to atmosphere through exhaust groove 103. This will cause the pressure to drop in pressure port 117 and the plunger 115 will drop, allowing bias-spring 113 to push the lever 109 up, thereby lifting the spool valve to a position slightly below its central position. This enables the table to move along at a normal rate across the cavity, even though there is no knee actuation. When the stylus is again deflected, then the normal operation of the machine takes over, pressure being restored to port 117.

It will be understood that wherever cylinder and piston combinations are specified, or gear-type motors shown, a fluid motor of any other suitable variety could be directly substituted.

Additionally it will be recognized that the invention shown is in essence a machine tool control for directing and controlling the movement of machine tool elements along a pair of non-parallel axes. A die sinking machine has been shown as an example and as the presently preferred embodiment. However, it will be understood that this invention is of general application to machine tools of the above class and the other uses for it include such devices as lathe followers, milling machines, and the like.

This invention provides a machine tool control which is automatic in the true sense of the word. It travels along a profile without requiring attention from an operator, because there are no circumstances under which it will "hang up." When it reaches the end of a stroke in either direction, the limit switches 145 and 146 may be utilized to actuate auxiliary equipment as desired, for example, to reverse the position of the four-way valve to cause the machine to travel in the other direction either as a quick return so it can traverse the pattern again in the same direction, or in a cutting path in the reverse direction. Also, the switches could be utilized to operate a control in a third direction such as a pick feed to step the device over by some increment so as to follow the contour of the next section of the pattern. This provides a completely automatic three-dimension tracing system.

Certain dimensional relationships should be observed in the use of the device shown. In FIG. 7 there has been shown a relationship between the diameter of the stylus and that of the cutter. In unidirectional tracing, that is, where the cuts are made in one direction, the stylus should be over-sized on its radius relative to the cutter by an amount approximately equal to the distance the spool must shift from its lowest position as limited by the seat 37 to the central position. In a practical valve this is ordinarily approximately .004 inch. The effect of this relationship is that a cavity in a die will be cut true to size and will be displaced from its true position by this distance. This is because in traveling one direction and coming to a cavity, the table will continue to travel until the side of the stylus (while in a vertical position) clears the walls of the cavity, while in order to rise in climbing a far wall of the cavity the stylus must be tilted. The actual dimension is a function of the ratio between dimensions A and B on the stylus, and the adjustment of the lowest spool position. The reason that A and B on the stylus are suggested as a one-to-one relationship is so that there can be a direct dimensional relationship between the valve dimensions and the workpiece dimensions.

If it is desired to cut a cavity to true dimensions at its true location, then it is necessary to stroke the pattern in the same plane in two directions and utilize a relationship where the difference between the diameter of the cutter (dc) and the diameter of the stylue (ds) is twice the aforesaid dimension. The result of this is that the cavity will be truly cut and at its correct location. In order that the side dimensions may also be truly cut it is necessary also to stroke crosswise. The above dimensional relationships are familiar to persons skilled in the art, and are easily adjusted and compensated for in the normal course of using cutting tools. It is appropriate here to point out that this device is fully capable of reproducing exact contours of patterns. Because of the automatic operation the tilt of the stylus for a given movement is always the same amount, and does not depend on where the operator may stop the table travel as in hand-operated duplicators with only a knee cylinder control. This uniformity results in superior surface finishes and more accurate reproductions.

It will also be noted that this device is capable of cutting even square shoulders for the reason that when there is a vertical plunge or a vertical rise, table feed can be entirely cut off until the plunge or rise is completed.

This invention is not to be limited by the embodiments shown in the drawing and described in the description, which are given by way of example and not of limitation, but only in accordance with the scope of the appended claims.

I claim:

1. A control valve adapted to control a machine tool of the class which includes two fluid motors, each motor being adapted to move an element of said machine tool along one axis of a pair of non-parallel axes, said element serving to adjust the position of a cutting tool in relation to a workpiece and the position of the control valve in relation to a pattern, said control valve comprising: a valve sleeve member having an interior wall forming a spool passage, said passage having a central axis; a valve spool member having in said sleeve passage a peripheral surface, said surface having a central axis, the portions of the wall and surface which contact each other being cylindrical so that the members are adapted for relative axial sliding and rotational movement; and a stylus mounted to one of said members and contacting the other member for causing relative axial movement between said members in response to the relative position between the stylus and the pattern; said valve sleeve member having a pressure passage therethrough opening into the spool passage, a first and a second motor supply groove in the interior wall disposed on axially opposite sides of the opening of the pressure passage into the spool passage from each other, a first and a second motor supply port through the sleeve respectively connected to the first and second motor supply grooves, and a first and a second exhaust passage through the sleeve, each of said exhaust passages opening into the spool passage at the opposite side of the first and second motor supply grooves, respectively, from the pressure passage, an inlet port and an outlet port, both spaced from the aforesaid grooves and passages and on the same side thereof, passing through the sleeve and opening into the spool passage at axially spaced apart locations, and flow channel means formed in said interior wall spaced from and disposed between the openings into said interior wall of said inlet port and said outlet port; said valve spool member having formed in its periphery a pressure groove, a pair of exhaust grooves, a first and a second control land, one of said lands being disposed between each of said exhaust grooves and the pressure groove, and a third control land spaced from said first and second control lands and from the exhaust grooves, the valve spool member having an axially central position in the valve passage defined as that position where the third control land is centered at the flow channel means, at which central position the pressure groove is disposed opposite the pressure passage, and the exhaust grooves are disposed opposite the exhaust passages, a pair of axially spaced-apart hollows in said third land, and a hollow in each of the first and second lands in fluid communication with the exhaust groove which is adjacent to the respective land, a pair of depressions in the interior wall of the spool passage, one of said depressions being formed at the side of each motor supply groove farthest from the pressure passage, and in fluid communication with its respective motor supply groove, a pair of axially spaced-apart depressions in said interior wall at least in part bounding the flow channel means, each of said depressions and each of said hollows including a first segment extending in a first direction non-parallel to the central axes, and a second and third segment respectively intersecting the ends of the first segment at an angle and lying on the same side of the respective first segment, the second and third segments on the valve spool member extending in the opposite direction from their respective first segments than the second and third segments on the valve sleeve member which they are adapted to overlap, the first segments of the hollows on the third land being axially closer together than the first segments bounding the flow channel means, the first segments of the depressions at the motor supply grooves and of the first segments of the hollows in the first and second lands being substantially equally spaced apart, the first segments of depressions and hollows being angularly oriented to co-act with one another in pairs, the circumferential length of the first segments of the respective members of each pair being substantially equal, a first motor supply circuit being formed from the inlet port through the flow channel means and out the outlet port, the rate of flow therethrough being at its maximum when the depressions and the hollows at the said flow channel means are rotationally aligned and the valve spool member is in its central position with the third control land centrally disposed relative to the first segments of the depressions in the flow channel means and is decreased when the spool is either rotated or axially shifted away from said position, a second motor supply circuit being formable from said pressure passage to either one of the motor supply grooves and from the other motor supply groove to its adjacent exhaust passage, no second motor supply circuit being formed when the valve spool member is at its central position, the rate of flow through the first motor supply circuit then being at its maximum, axial movement of the spool in one direction or the other connecting one or the other of the motor supply grooves to the pressure passage and the other to an exhaust passage to form a second motor supply circuit when respective first segments are at least in part angularly overlapped, the rate of fluid flow through the first motor supply circuit thereby being rendered inversely proportional to that through the second motor supply circuit.

2. A control valve according to claim 1 in which all first segments of opposed hollows and depressions are angularly oriented so as to have the same degree of angular overlap at any rotational adjustment between the sleeve and the spool.

3. A control valve according to claim 1 in which the first segments lie in a plane which is perpendicular to the central axes, and in which the second and third segments are parallel to said central axes.

4. A control valve according to claim 1 in which the first segments which are adapted to overlap each other are substantially parallel to each other.

5. A control according to claim 1 in which means are provided for rotating the spool in the sleeve.

6. A control according to claim 1 in which the total peripheral length of all first segments on any control edge, as projected on a plane that is normal to the central axis, is less than one-half the circumference of the spool.

7. A control according to claim 1 in which the control edges at the third control land and at the flow channel means have twice as many depressions and hollows as any other control edge.

References Cited in the file of this patent

UNITED STATES PATENTS 2,331,817    Turchan  ------------------ Oct. 12, 1943
2,686,650    Evans  -------------------- Aug. 17, 1954